United States Patent Office 3,432,277
Patented Mar. 11, 1969

3,432,277
DERIVATIVES OF PHOSPHINODITHIONIC ACID AND METHOD FOR THEIR PREPARATION
Herbert W. Roesky, Gottingen, Germany, assignor to E. I. du Pont de Nemours and Company, Wilmington, Del., a corporation of Delaware
No Drawing. Filed Aug. 3, 1966, Ser. No. 569,818
U.S. Cl. 23—357  9 Claims
Int. Cl. C01c 1/20

ABSTRACT OF THE DISCLOSURE

Products having one of the formulas:

(I)
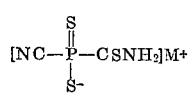

and (II)
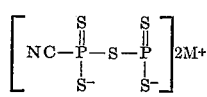

wherein M is hydrogen, an alkali metal cation, the ammonium cation, $NH_4^+$, or an onium cation $R_4Y^+$, in which Y is nitrogen or phosphorus, and R is a 1–6 carbon hydrocarbon radical free of aliphatic unsaturation are prepared in one or more steps from an alkali metal cyanide and phosphorus pentasulfide. The products are useful in the analytical determination of certain cations by gravimetric methods or in the removal of such cations from solution; and, because of their strong reducing power, they also find use as analytical reagents in the determination of the oxidizing strength of various oxidizing agents.

---

This invention relates to novel compounds, more particularly to derivatives of phosphinodithioic acid, and to a method of preparing them.

The products of this invention have one of the formulas:

(I)
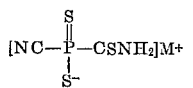

and (II)
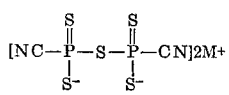

in which M is hydrogen, an alkali metal cation, the ammonium cation, $NH_4^+$, or an onium cation, $R_4Y^+$, where Y is nitrogen or phosphorus and R is a 1–6 carbon hydrocarbon radical free of aliphatic unsaturation.

These products can be viewed as derivatives of phosphinodithioic acid,

[For the nomenclature of phosphorus acid derivatives, see Chem. Eng. News 30, 4515–4522 (1952).] In Formula I, the anion shown in brackets is therefore the cyano(thiocarbamoyl)phosphinodithioate anion, and in Formula II it is the P,P'-thiobis(cyanophosphinodithioate anion).

These products are prepared in one or more steps from an alkali metal cyanide and phosphorus pentasulfide, as follows:

The salts of Formulas I and II where M is an alkali metal cation are prepared by reacting an alkali metal cyanide with phosphorus pentasulfide, in a mole ratio of the first reactant to the second of at least 4:1, in a reaction medium which is acetonitrile or an ether of the group of 1,2-dimethoxyethane, 1,5-dimethoxy-3-oxapentane and tetrahydrofuran, at a temperature in the range of 15 to 75° C., followed by treatment of the soluble reaction product with water.

From these products, the salts where M is an onium cation are obtained by metathetical reaction in an aqueous medium with the appropriate onium halide $R_4Y^+X^-$, where X is a halide ion and R and Y are as previously defined.

The free acids (M=H) are obtained in a cation-exchange reaction by contacting a solution of a quaternary ammonium or phosphonium salt with an ion-exchange resin in its hydrogen (acidic) form.

The salts of Formulas I and II where M is the ammonium cation can be prepared by treating the free acid with aqueous ammonia.

Whenever molar quantities of phosphorus pentasulfide are mentioned, it is to be understood that they refer to $P_4S_{10}$, the accepted formula for this compound, rather than to the older formula $P_2S_5$.

The cyanide reactant can be any alkali metal cyanide, sodium and potassium cyanide being preferred. When salts of the anion of Formula I are desired, the reaction is conducted with acetonitrile as the reaction medium. Salts of the anion of Formula II are obtained when the reaction is conducted either in acetonitrile or in an ether as the reaction medium. Suitable ethers are the dimethyl ethers of ethylene glycol or diethylene glycol, i.e., 1,2-dimethoxyethane and 1,5-dimethoxy-3-oxapentane, and tetrahydrofuran. It is not necessary that these nitrile or ether reaction media have any substantial solvent power for the reactants. They are, however, solvents for the reaction product.

The alkali metal cyanide is used in amounts of at least 4 moles per mole of phosphorus pentasulfide ($P_4S_{10}$). Preferably, this molar ratio is between 8:1 and 15:1 when the products of Formula I are prepared, and between 6:1 and 15:1 for the products of Formula II.

The reaction is rapid and even slightly exothermic. It can be carried out at room temperature of 15–25° C. but slightly higher temperatures of the order of 35–50° C. are preferably used. It is unnecessary, and may be undesirable, to exceed about 75° C. The reaction is usually substantially completed within one hour or less.

The reaction product is most conveniently isolated by filtering the reaction mixture to separate the unchanged reactants and insoluble coproducts, then evaporating the filtrate dryness. The residual solid is then treated with water, in which it dissolves at ordinary or slightly elevated temperature. The aqueous solution contains the salt of the anion of Formula I or II, as the case may be, with the cation of the cyanide reactant employed.

If desired, these salts can be isolated, for example, by evaporation of the aqueous solution under reduced pressure. Preferably, they are converted to the more readily purifiable, easier to handle quaternary ammonium or phosphonium salts. This is done simply by treating the aqueous solution of the alkali metal cyano(thiocarbamoyl)phosphinodithioate or P,P'-thiobis(cyanophosphinodithioate) with at least a molar equivalent, preferably an excess, of a tetrahydrocarbylammonium- or tetrahydrocarbylphosphonium halide (chloride, bromide or iodide). The quaternary onium salt resulting from the metathetical reaction precipitates from the aqueous solution. It is collected by filtration and purified, if necessary, by crystallization from an appropriate solvent.

Cyano(thiocarbamoyl) phosphinodithioic acid and P, P'-thiobis(cyanophosphinodithioic acid) can be prepared by bringing an aqueous or organic solvent solution of one of their quaternary onium salts in contact with one of the commercially available polymeric ion-exchange resins in its hydrogen form, i.e., containing a plurality of sulfonic or carboxyl groups. An exchange of cations takes place and the free phosphorus thioacid forms in solution in the solvent employed.

Treatment of the free acid in solution either in water or in a water-miscible organic solvent with an excess of aqueous ammonia, followed if necessary by partial or complete evaporation of the solvent under reduced pressure, affords the corresponding ammonium salt.

The following examples illustarte the invention.

EXAMPLE 1

A stirred mixture of 4.4 g.(0.01 mole) of phosphorus pentasulfide and 5.9 g. (0.12 mole) of sodium cyanide in 50 ml. of acetonitrile was warmed to 35° C. and held at that temperature for 0.5 hour. The reaction mixture was cooled to room temperature, filtered under nitrogen, and the filtrate was evaporated under reduced pressure. The residual yellow solid was dissolved in 50 ml. of water.

To this solution, which contained sodium cyano-(thiocarbamoyl)phosphinodithioate, was added an excess of tetrapropylammonium bromide. A yellow solid precipitated immediately. This solid was recovered by filtration and crystallized from methanol. After drying under reduced pressure at room temperature, there was obtained 2.0 g. of tetrapropylammonium cyano(thiocarbamoyl) phosphinodithioate,

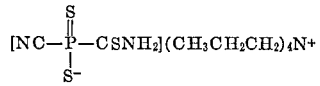

as a crystalline solid, M.P. 101–102° C. (dec.). After another recrystallization from methanol, this product melted at 114–115° C.

Analysis.—Calcd. for $C_{14}H_{30}N_3PS_3$: C, 45.76; H, 8.18; N, 11.45; P, 8.45; S, 26.17. Found: C, 45.99; H, 8.20; N, 11.27; P, 9.28; S, 26.50.

Potassium cyano (thiocarbamoyl) phosphinodithioate can be prepared in the same manner, starting with potassium cyanide. Replacing tetrapropylammonium bromide in the second step of the operation by other quaternary ammonium or phosphonium halides such as trimethylethylammonium iodide, tetra-n-hexylammonium bromide, diethyldiphenylammonium iodide or tetraethylphosphonium bromide in the second step of the operation by cyano(thiocarbamyl)phosphinodithioate anion.

EXAMPLE 2

A mixture of 4.4 g. (0.01 mole) of phosphorus pentasulfide and 2.9 g. (0.06 mole) of sodium cyanide in 50 ml. of 1,2-dimethoxyethane was stirred at room temperature for about 0.5 hour, during which time the mixture become gradually warmer. To complete the reaction, the mixture was stirred at 40° C. for another 0.5 hour, after which it was cooled to room temperature and filtered under nitrogen. The solvent was removed from the filtrate under reduced pressure and the solid yellow residue was dissolved in water.

To this solution, which contained sodium P,P'-thiobis(cyanophosphinodithioate) was added excess tetrapropylammonium bromide. A yellow solid precipitated at once. This solid was recovered by filtration and crystallized from boiling methanol. A second crystallization from methanol gave 2.0 g. of tetrapropylammonium P,P'-thiobis(cyanophosphinodithioate),

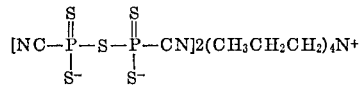

as a light yellow crystalline solid, M.P. 204° C. (dec.).
Analysis.—Calcd. for $C_{26}H_{56}N_4P_2S_5$: C, 48.25; H, 8.66; N, 8.66; P, 9.60; S, 24.78. Found: C, 48.03; H, 8.78; N, 8.86; P, 9.62; S, 25.24.

Potassium P,P'-thiobis(cyanophosphinodithioate) can be prepared in the same manner, using potassium cyanide instead of sodium cyanide. Replacing tetrapropylammonium bromide in the second step of the operation by other quaternary ammonium or phosphonium halides such as ammonium iodide, tetra-n-butylammonium chloride, triphenylmethylammonium bromide, tetramethylphosphonium iodide or triphenylmethylphosphonium bromide affords the corresponding salts of the P,P'-thiobis(cyanophosphinodithioate anion).

EXAMPLE 3

A mixture of 11 g. (0.025 mole) of phosphorus pentasulfide and 11 g. (0.22 mole) of sodium cyanide in 100 ml. of acetonitrile was stirred at 40° C. for about 1 hour, cooled and filtered. The filtrate was evaporated under reduced presure and the residual yellow, oily solid was dissolved in water. Upon addition of tetrapropylammonium bromide to the solution, a white-yellow solid precipitated, which was recovered by filtration and washed with methanol. The methanol-soluble portion of the precipitate was found to be tetrapropylammonium cyano (thiocarbamoyl)phosphinodithioate. The methanol-insoluble portion was tetrapropylammonium P,P'-thiobis (cyanophosphinodithioate).

EXAMPLE 4

A solution of 3 g. of tetrapropylammonium P,P'-thiobis(cyanophosphinodithioate) in 100 ml. of acetonitrile was passed through a column of a commercial sulfonated polystyrene copolymer cation-exchange resin (hydrogen form) filling a tube 60 cm. long and 2.5 cm. inside diameter. The column was then washed by passing 100 ml. of acetonitrile through the tube. The total eluate was concentrated to a small volume by evaporation under reduced pressure at room temperature. The residual acetonitrile solution contained P,P'-thiobis(cyanophosphinodithioic acid), as shown by the fact that, on treatment with tetrapropylammonium bromide, there was formed a precipitate of tetrapropylammonium P,P'-thiobis(cyanophosphinodithioate), identical with the product of Example 2.

Instead of using the tetramethylammonium salt in the above-described cation-exchange reaction, other quaternary ammonium or phosphonium salts can be used, such as the tetra-n-amylammonium or the tetrapropylphosphonium salts. The same procedure affords cyano(thiocarbamoyl)phosphinodithioic acid when applied to, for example, tetramethylammonium or tetrapropylammonium cyano(thiocarbamoyl)phosphinodithioate.

Other solvents can be used in this cation-exchange reaction, such as water if the initial salt is sufficiently water-soluble, methanol or methanol-water mixtures.

Ammonium cyano(thiocarbamoyl)phosphinodithioate and ammonium P,P'-thiobis(cyanophosphinodithioate) are obtained on treatment with excess aqueous ammonia of the free acid solutions obtained as above, followed by evaporation of the solvent under reduced pressure.

The products of this invention precipitate large cations (e.g., $Cr^{II}$, $Mn^{II}$, $Pd^{II}$, $Pt^{II}$, $Hg^I$, $Hg^{II}$, $TH^{IV}$, $U^{IV}$, etc.) from aqueous solutions of salts of these cations. Thus, they are useful in the analytical determination of such cations by gravimetric methods, or in their removal from aqueous solutions when this is desired.

Further, the products of this invention are strong reducing agents. For example, they rapidly reduce potassium permanganate in aqueous solution. Thus, they are useful as analytical reagents in the determination of the oxidizing strength of various oxidizing agents.

For applications of the type mentioned above, the products of this invention can be used in aqueous solution when they are sufficiently soluble in water, or in solution in water-miscible organic solvents such as methanol or acetonitrile.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the class consisting of

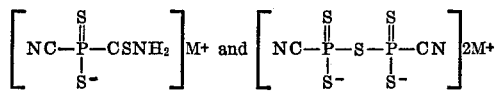

in which M is of the class consisting of hydrogen, an alkali metal cation, the ammonium cation, NH$_4^+$, and an onium cation of the formula R$_4$Y$^+$, where Y is nitrogen or phosphorus and R is a 1-6 carbon hydrocarbon radical free of aliphatic unsaturation.

2. Tetrapropylammonium cyano(thiocarbamoyl)phosphinodithioate, the compound of the first formula of claim 1, wherein M$^+$ is (CH$_3$CH$_2$CH$_2$)$_4$N$^+$.

3. Tetrapropylammonium P,P' - thiobis(cyanophosphinodithioate), the compound of the second formula of claim 1, wherein M$^+$ is (CH$_3$CH$_2$CH$_2$)$_4$N$^+$.

4. Compounds of claim 1 wherein M is hydrogen.

5. P,P'-thiobis(cyanophosphinodithioic acid), the compound of the second formula of claim 1, wherein M is hydrogen.

6. Process for preparing compounds of claim 1 where M is an alkali metal cation which comprises reacting an alkali metal cyanide with phosphorus pentasulfide, in a mole ratio of the first reactant to the second of at least 4:1, in a reaction medium of the class consisting of acetonitrile and an ether of the group of 1,2-dimethoxyethane, 1,5 - dimethoxy-3-oxapentane and tetrahydrofuran, at a temperature in the range of 15 to 75° C., followed by treatment of the soluble reaction product with water.

7. Process for preparing compounds of claim 1 where M is an onium cation which comprises reacting metathetically in an aqueous medium a salt of claim 1 in which M is an alkali metal cation with an onium halide of the formula R$_4$Y$^+$X$^-$, wherein X is a halide ion and R and Y are as defined in claim 1.

8. Process for preparing compounds of claim 1 wherein M is hydrogen which comprises contacting a solution of a quaternary ammonium or phosphonium salt of claim 1 with an ion-exchange resin in its acidic form.

9. Process for preparing compounds of claim 1 wherein M is the ammonium cation which comprises treating a compound of claim 1 in which M is H with aqueous ammonia.

References Cited
UNITED STATES PATENTS 3,157,465  11/1964  Nielsen.
2,870,204  1/1959  Lecher et al.

EARL C. THOMAS, *Primary Examiner.*

H. S. MILLER, *Assistant Examiner.*

U.S. Cl. X.R.
260—567.6, 606.5

PO-1050
(5/69)

UNITED STATES PATENT OFFICE
CERTIFICATE OF CORRECTION

Patent No. 3,432,277                     Dated   March 11, 1969

Inventor(s)    Herbert W. Roesky

It is certified that error appears in the above-identified patent and that said Letters Patent are hereby corrected as shown below:

Col. 1, line 22, formula (II) of the Abstract, the last "P" of the formula should be followed by -- -CN --;

Col. 2, line 51, "to" should be inserted between "filtrate" and "dryness";

Column 3, lines 47 and 48, "in the second step of the operation by cyano(thiocarbamyl)phosphinodithioate anion," should be replaced by -- affords the corresponding salts of the cyano(thiocarbamoyl)phosphinodithioate anion. --;

Col. 4, line 61, "$TH^{IV}$" should be -- $Th^{IV}$ --;

Col. 4, line 43, "tetramethylammonium" should be -- tetrapropylammonium --;

SIGNED AND
SEALED
MAY 19 1970

(SEAL)
Attest:

Edward M. Fletcher, Jr.

Attesting Officer

WILLIAM E. SCHUYLER, JR.
Commissioner of Patents